United States Patent [19]

Usagawa

[11] Patent Number: 4,606,475
[45] Date of Patent: Aug. 19, 1986

[54] COMBINATION MEASURING APPARATUS

[76] Inventor: Mitsugu Usagawa, 2-19-8, Ujinakaigan, Minami-ku, Hiroshima-shi, Hiroshima-ken, Japan

[21] Appl. No.: 630,580

[22] Filed: Jul. 10, 1984

[30] Foreign Application Priority Data

Jul. 19, 1983 [JP] Japan ............... 58-130277

[51] Int. Cl.$^4$ ............... B67D 5/08
[52] U.S. Cl. ............... 222/58; 141/83; 53/502
[58] Field of Search ............ 222/52, 57, 55, 56, 222/58, 638, 196; 53/502; 141/83; 49/31, 381

[56] References Cited

U.S. PATENT DOCUMENTS 3,822,032  7/1974  Vergobbi ............... 141/83
4,501,339  2/1985  Fukuda ............... 141/83

FOREIGN PATENT DOCUMENTS 0114075  7/1984  Japan ............... 141/83

Primary Examiner—Joseph J. Rolla
Assistant Examiner—Kenneth Noland
Attorney, Agent, or Firm—Browdy and Neimark

[57] ABSTRACT

The invention of this application relates to a combination measuring apparatus which includes a cone-shaped dispersion table positioned below a feed port into which the commercial products which are the objects being measured are charged; pool hoppers and measuring hoppers disposed vertically as a predetermined number of units and connected to troughs which are disposed around the dispersion table via an electromagnetic oscillator or the like, whereby the measuring hoppers are supported by weight detectors such as load cells; and push rods for lid operation links, being moved back and forth by a driving device disposed inside the group of pool and measuring hoppers so that the object to be measured can flow and be measured.

14 Claims, 12 Drawing Figures

COMBINATION MEASURING APPARATUS

BACKGROUND OF THE INVENTION

1. Field of the Invention

The invention relates to the automatic measuring techniques for accurately measuring the weight of commerical products of granular foodstuffs, such as beans, before transferring them to a packaging process.

2. Description of the Prior Art

Among a large number of commercial products put on the market, granular foodstuffs such as beans are frequently sold as packaged goods.

If the actual weight of the contents of one package is less than the listed weight, a question of commercial morality is raised; but if it is greater, a problem concerning cost is raised for the seller. Hence, the weight must be accurately measured before packaging.

In practice, however, it is impossible to accurately measure the goods to a set weight, and the following method has generally been used in recent years.

The objects being measured are dispersed within a suitable dispersion range, each objects is then measured and the separate measured values thus obtained by the dispersion measurement are combined and calculated in accordance with probability and statistical logic so that the combined weight becomes a "plus minimum over quantity". The objects thus measured are packaged in individual packages.

Operational control techniques using a large number of so-called "pool" and "measuring" hoppers and a microcomputer solve this problem.

The so-called "combination measuring apparatus" in accordance with the prior art will now be described in more detail, with reference to FIG. 1. An inner frame 3 is provided above a frame 2 of a combination measuring apparatus 1, and an upper frame 4 is provided above the inner frame 3. A dispersion table 7 is positioned on this upper frame 4, concentrically with a feed port 6 for the objects being measured, in such a manner that the dispersion table 7 can rock and reciprocate through a set angle. Troughs 9 are arranged in the radial direction around the dispersion table 7, on electromagnetic vibrators 8. A pool hopper 10 and a measuring hopper 12 are provided for each trough 9 in a circumferential arrangement about the upper frame 4. Each measuring hopper 12 is positioned below the corresponding pool hopper 10, and is supported by a weight detector 11 such as a load cell provided on the frame. One each of a pool hopper 10 and a measuring hopper 12 form one unit, and 14 units, for example, are positioned around the upper frame 4. The objects being measured, such as beans, are charged from the feed port 6, are dispersed by the dispersion table 7, are sequentially by the troughs 9 to each pool hopper 10 to the corresponding measuring hopper 12, and are measured by the weight detector 11. A combination of "plus minimum over quantities" from among these measuring hoppers 12 is selected by a micro-computer (not shown), and the objects being measured are charged by the frame 2 into gathering chutes 13, 14 positioned therebelow and are thereafter transferred to the subsequent packaging step.

In the measuring and discharge process described above, covers 15, 16, 16' of the pool and measuring hoppers 10 and 12 must be opened and closed. The operating mechanisms for these covers are constructed as follows. Driving devices 19 such as cam mechanisms are arranged around a motor 17 so as to face each of the pool and measuring hoppers 12, and are driven by the motor 17 via a gear mechanism 18. Push rods 20, 21, 22 move back and forth in the radial direction in response to the operation of the corresponding driving devices, thereby openig and closing cover-operating links 23, 24, 25 for the covers 15, 16, 16'.

In accordance with the logic illustrated in FIG. 1, a predetermined number, 14 for example, of pool hoppers 10 and measuring hoppers 12 must be arranged around the upper frame 4 at a predetermined spacing. This construction inevitably results in an increase in the circumferential dimensions thereof. Moreover, weight detectors 11, such as load cells, must be provided outside the measuring hoppers 12 so as to correspond thereto, so that the size of the apparatus becomes even greater, and the space required for its installation is also greater.

This also leads to an increase in the production cost, an increase in the vibration of the apparatus, and to a drop of the measuring accuracy.

In order to reduce the size of the apparatus, it is theoretically possible to position the pool and measuruing hoppers 10 and 12 closer to one another with smaller gaps between them to reduce the outer dimensions of the apparatus. However, since the driving devices 19 operating the cover-operating links 23, 24, 25 of the pool and measuruing hoppers 10, 12 are moutned on the upper frame 4 and, moreover, since the moter 17 is disposed within the driving devices 19, a reduction in the gaps between the pool and measuring hoppers 10 and 12 leads to a reduction in the gaps between the driving devices 19 and the corresponding mechanisms, so that the driving devices interfere with the motor 17. Thus, in practice such a construction is not possble.

Accordingly, when designing a practical apparatus, the size of the motor 17 has the greatest priority, the size of the driving devices 19 is then determined thereby, followed by the sizes of the pool and measuring hoppers 10, 12 and their spacing. For these reasons, this combination measuring apparatus can not be made compact.

In conjunction with the construction of the combination measuring apparatus, the space within the circle of pool and measuring hoppers 10, 12 can not be utilized sufficiently and, even if the size of the apparatus is reduced as far as possible, the driving devices 19 or the motor 17 are utilized only spottily.

Since the structure is not compact, the operating distances of the gears, links, and push rods are large, and the power required by them is also large. Wear as well as vibration are also great, and problems are likely to occur.

The flow quantity and flow process of the objects being measured are also large and the response characteristics of the combination measuring apparatus drop, thus hindering any improvement in the performance thereof.

SUMMARY OF THE INVENTION

The present invention is directed to solving the technical problems with the prior art, described above, which prevent a reduction in the size of the combination measuring apparatus and reduce its performance, and provides a combination measuring apparatus which fully utilizes the logical advantages of the apparatus, can reduce the size thereof by a simple structure without generating any design problems, reduces the operating distances of mechanical portions to improve the response characteristics of the apparatus, and is effectively useful in the field of measurement in the distribution industry.

DETAILED DESCRIPTION OF THE PREFERRED EMBODIMENT

Figure 1:
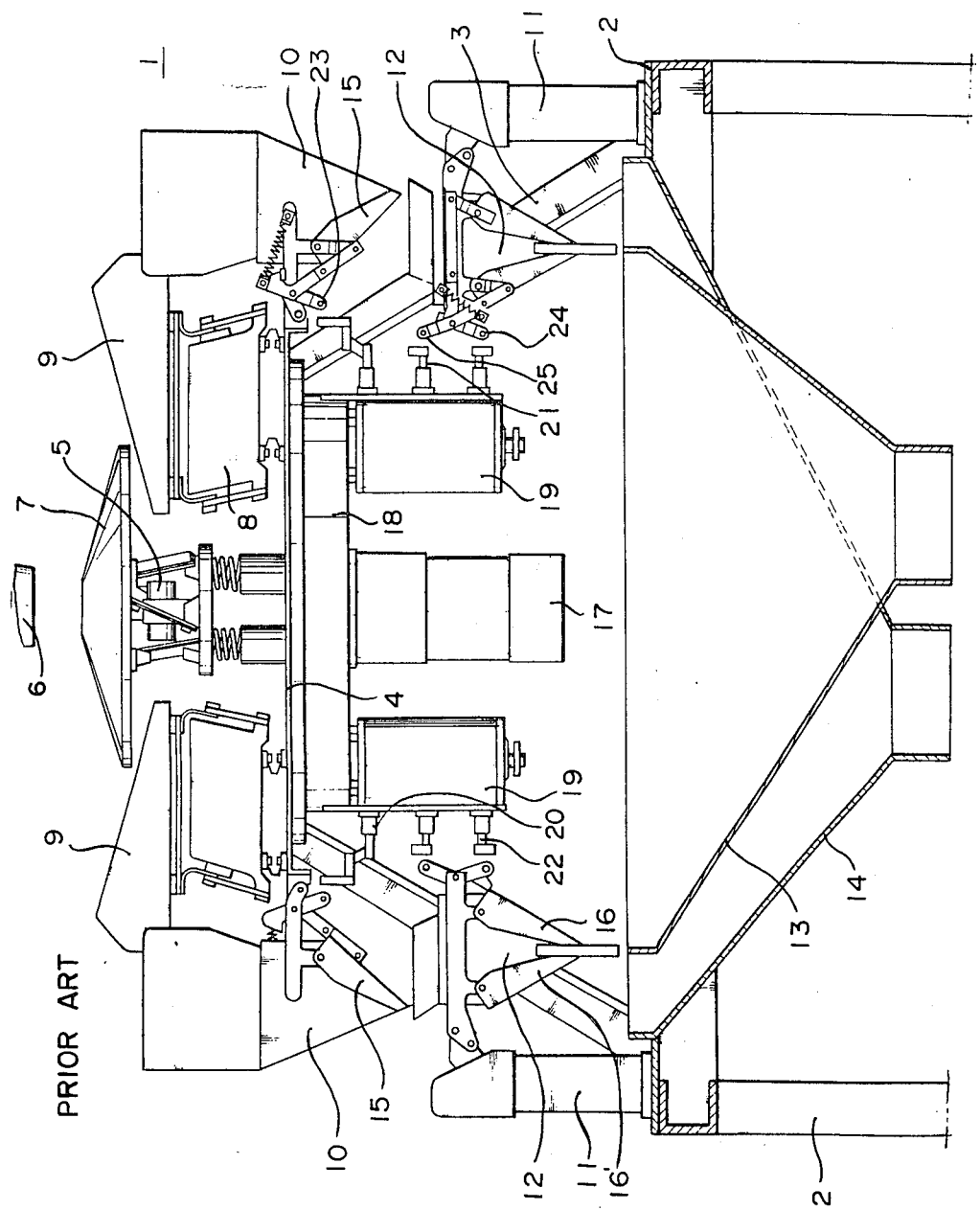
FIG. 1 is a schematic side view of a combination measuring apparatus in accordance with the prior art.

Hereinafter one embodiment of the present invention will be explained with reference to FIG. 2, etc., in which like reference numerals are used to identify similar constituent members to those in FIG. 1.

Figure 2:
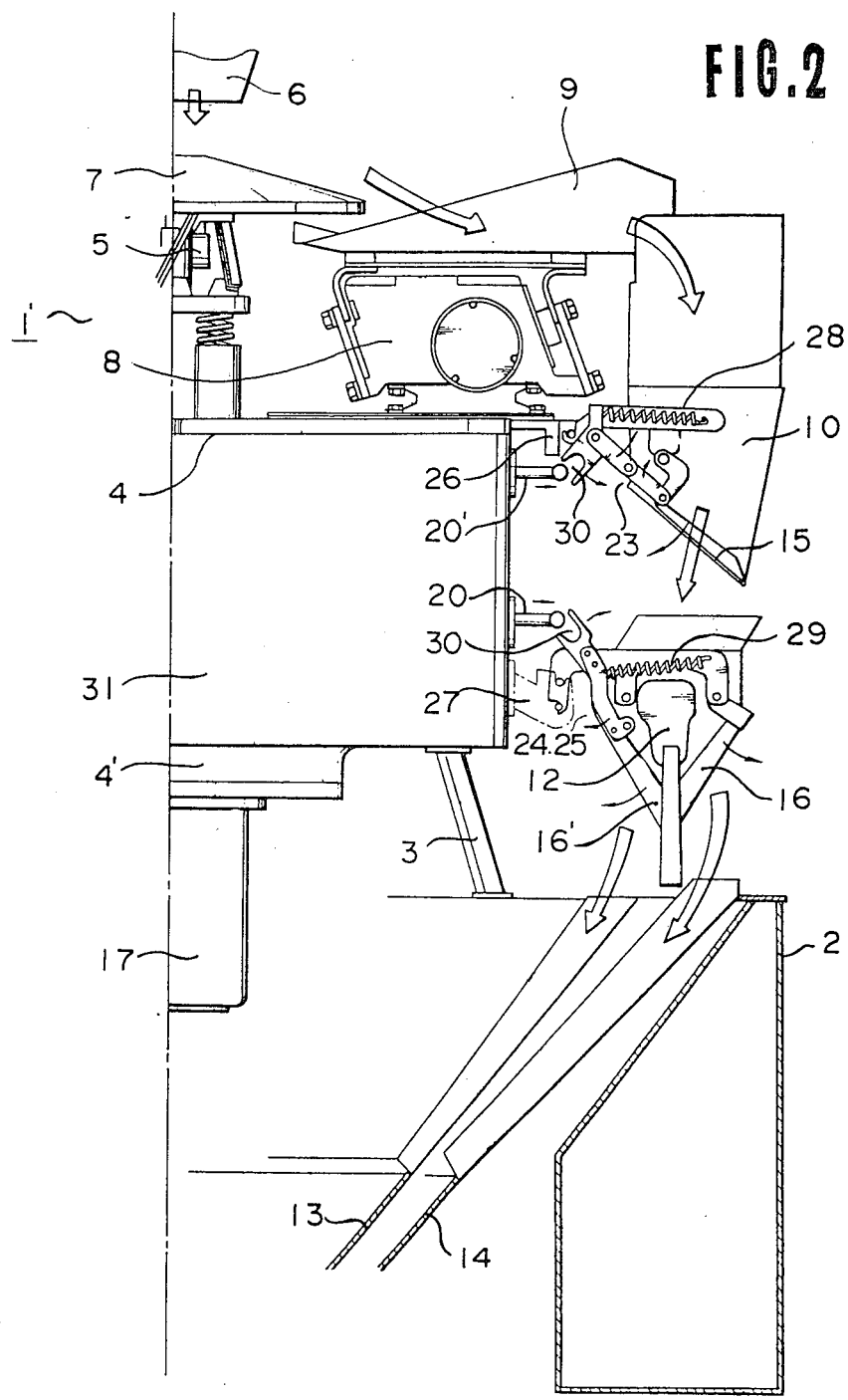
FIG. 2 is a partial sectioned side view.

Reference numeral 1' represents the combination measuring apparatus constituting the gist of the present application, its structure is schematically illustrated in FIG. 2 (in which only a section of the right half thereof is illustrated for the purpose of descrepion, but the left half has the same construction, and each mechanism is equidestantly arranged therein). Upper and lower frames 4 and 4' are provided on an inner frame 3 on top of a frame 2, and a dispersion table 7 is positioned concentrically with the center of the upper surface of the upper frame 4 immediately below a charging port 6 in a upper portion, on a heretofore known electromagnetic oscillator 5, in such a fashion that the dispersion table 7 can reciprocate in the circumferential direction through a set angle. A predetermined number, 14 for example, of troughs 9 are radially and equidestantly arranged around the dispersion table, on electromagnetic oscillators 8.

Pool hoppers 10 are arranged equidestantly in the circumferential direction on brackets 27 positioned around the upper frame 4 so as to correspond and to be connected to the troughs 9 by hooks, not shown, in the same way as in the prior art apparatus, so that the hoppers 10 can be attached by a simple operation. Corresponding measuring hoppers 12 are positioned below the pool hoppers on brackets 27, so that they can mesh with, and be attached to, load cells 11 (described later) in the radial direction, by a simple operation.

A cover 15 is pivotally supported about a base end thereof to the discharge port at the lower end of each pool hopper 10, and is normally biased in the closing direction by a tension spring 28 via a cover-operating link 23 connected to the spring 28.

A pair of covers 16, 16' of each measuring hopper 12 are normally biased in the closing direction by a tension spring 29 via cover-operating links 24, 25, respectively.

A fork-shaped hook 30 is formed at the end of each of the cover-operating links 23, 24 and 25.

Two gathering chutes 13, 14 are provided below the measuring hoppers 12, and are connected to a subsequent packaging process (not shown).

A cover plate 31 is provided around the entire circumference between the upper and lower frames 4 and 4', and 14 units, each consisting of one pool hopper 10 and one measuring hopper 12, are equidistantly arranged around the entire circumference, outside the cover plate 31.

Figure 3:
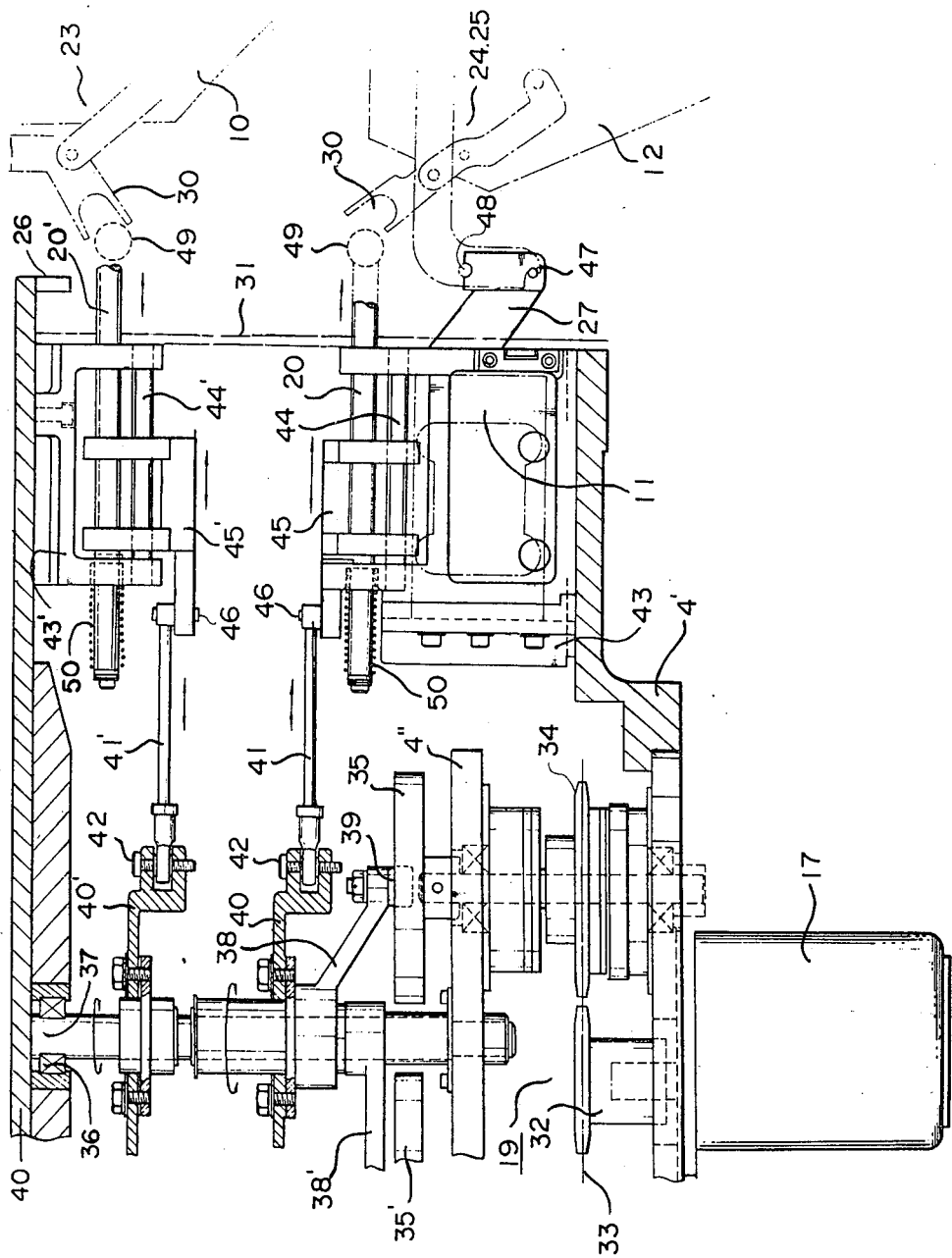
FIG. 3 is an enlarged partial sectioned side view of the driving mechanism in the space within the apparatus.

Mechanisms within the cover plate 31 will now be explained with reference to FIG. 3, etc. As illustrated in FIG. 3, a motor 17 equipped with a reduction gear is mounted below the central part of the lower frame 4' so that a pinion thereof, not shown, on the output shaft of the motor drives a driving sprocket wheel 32 by a gear mechanism, not shown, while the driving sprocket wheel 32 in turn drives a pair of follower sprocket wheels 34 by a chain 33.

The pair of follower sprocket wheels 34 each rotate oval grooved cams 35, 35' mounted on an intermediate frame 4" on brackets, not shown, through a predetermined distance.

In FIG. 3, only one follower sprocket wheel 34 and the oval grooved cam 35 of the right half of the apparatus are shown for the purpose of illustration, but another follower sprocket wheel 34 and the oval grooved cam 35' are also provided in the left half thereof.

A rocking shaft 37 is supported between the upper and intermediate frames 4 and 4" by a bearing 36 so as to be capable of rocking reely, and an arm 38 is pivotally supported at an intermediate part of the rocking shaft 37 so as to be capable of rocking relative to the rocking shaft 37, but not move vertically. A cam follower 39 which is pivotally supported at the end of the arm 38 fits into the cam grooves of the oval grooved cam 35 so that the arm 38 is rocked by the rotation of the cam.

A cam follower 39' provided at the end of an arm 38' fixed to a lower part of the rocking shaft 37 (and not shown), is pushed into the cam groove of the oval grooved cam 35' so as to rock the arm 38' in response to the cam rotation.

A rotary link 40 is attached to the upper surface of the arm 38 and another rotary link 40' is attached to the rocking shaft 37 above the arm 38. The rotary links 40, 40' support around them pivotally the base ends of connecting rods 41 and 41', correspondng to the pool hoppers 10 and the measuring hoppers 12, respectively, on pins 42.

Accordingly, the rocking of the cam follower 39 due to the cam 35 results in a rocking reciprocation through a set angle of the rotary link 40 about the rocking shaft 37, and the rocking reciprocation of the cam follower 39' on the arm 38' about the cam 35' results in a rocking reciprocation through a set angle of the rocking shaft 37 and the rotary link 40', independently of the rotary link 40.

Sub-frames 43 are attached to the lower frame 4' so as to face each of the measuring hoppers 12 in the radial direction, and sliders 45 that can move back and forth in the radial direction are positioned on pairs of guide bars 44 arranged in the radial direction on top of the subframes 43. The end of each connecting rod 41 is pivotally supported by the inner end portion of a slider 45 on a pin 46, so as to be capable of rocking and rotating relative thereto.

Sub-frames 43' of substantially U-shaped section in the longitudinal direction are arranged under the upper frame 4 so as to face the pool hoppers 10, and sliders 45' are positioned on guide bars 44' which are mounted on the undersides of the sub-frames 43', so as to be capable of moving back and forth in the radial direction. The end of each connecting rod 41' is supported at the inner end of a slider 45' in such a manner that it is capable of rocking and rotating relative thereto.

Figure 4:
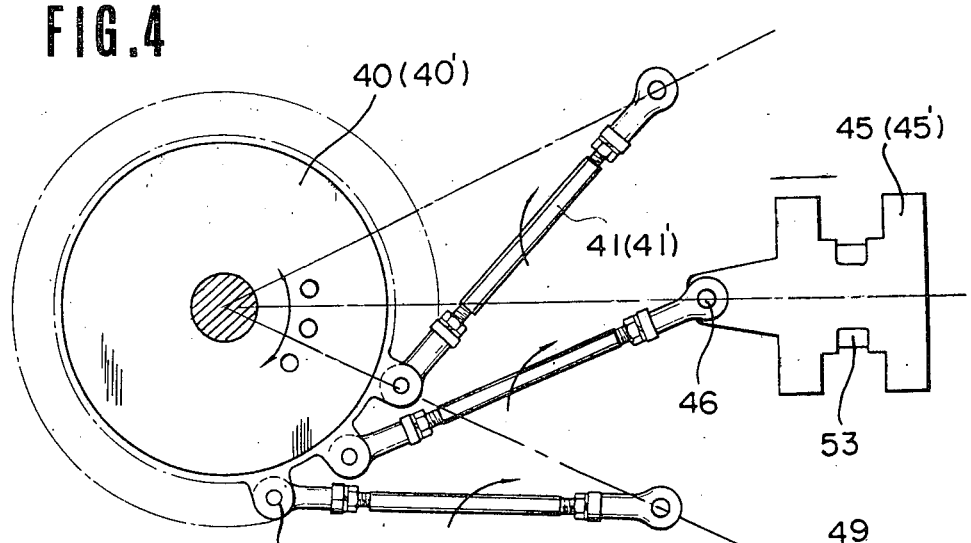
FIG. 4 is a schematic plan view of the connection between a rotary link and a slider.

Part of this embodiment is aslo shown in FIG. 4.

Each of the sub-frames 43 mounted on the lower frame 4' has a heretofore known load cell 11 acting as a weight detector mounted on one side surface thereof in the radial direction from the measuring hopper 12, and the bracket 27 is fitted onto the outer end of the load cell 11 so that the measuring hopper can be engaged and anchored by a simple operation on pins 47, 48. The weight of the objects being measured is detected by the load cell 11 and is input to a microcomputer, not shown.

In comparison with the prior art apparatus shown in FIG. 1, the load cells 11 of this embodiment are positioned further inward than the measuring hoppers 12 and, moreover, in the radial direction, so that the space within the circle of measuring hoppers 12 can be utilized efficiently.

Pairs of push rods 20 are mounted on the subframes 43 so as to be capable of moving back and forth in the radial direction, and two rollers 49 are provided outside and to the sides of the ends of each pair of push rods so as to face two fork-shaped hooks 30 on the cover-operating links 24, 25 that open and close the two covers 16, 16' of each measuring hopper 12. A compression spring 50 is interposed between a flange portion at the inner end of each push rod and the sub-frame 43 so as to urge the rod in the backward direction.

Each push rod 20 is inserted through the corresponding slider 45 and can move back and forth relative to the slider.

Figure 5:
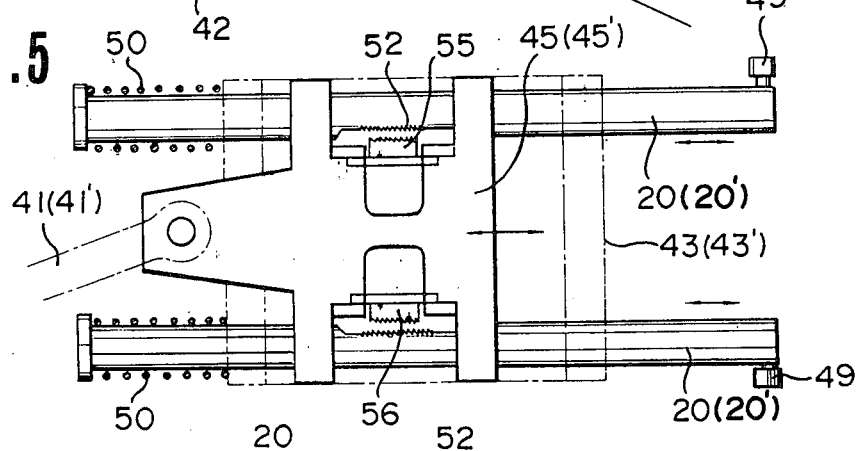
FIG. 5 is a schematic plan view of the connection between a slider and push rods.
Figure 6:
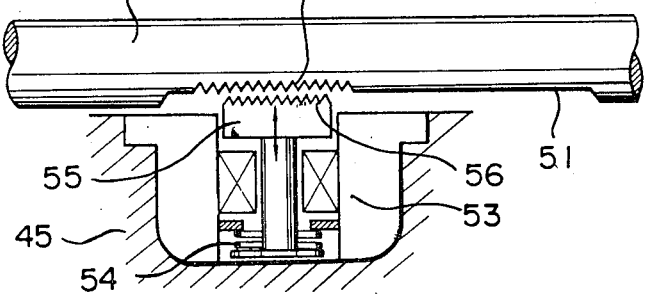
FIG. 6 is a schematic enlarged partial plan view of the clutch connection between a push rod and a slider.

As shown also in FIGS. 5 and 6, a flat surface 51 is formed on the inner side surface of each of the pair of push rods 20 within a predetermined stroke range and a rack 52 is defined on a predetermined part of this flat surface 51.

Solenoids 53 are provided on both side surfaces of the sliders 45 and tips 55 thereof are inwardly urged by compression springs 54. Racks 56 corresponding to the racks 52 on the push rods 20 are formed on the outer surface of each of the tips 55, so that when a current is applied to a solenoid 53 by a controller (not shown) at a predetermined timing, the tip 55 moves forward against the force of the compression spring 54 so that the rack 56 meshes with the rack 52 of the slider 45, thereby generating a clutch function such that the slider 45 and the push rods 20 moves integrally back and forth in the radial direction with respect to the sub-frame 43, and engage with or desengage from each hook 30 of the cover-operating link 25 of the measuring hopper 12 to open or close the cover.

The foregoing explains the relationship between the apair of push rods 20', 20' and the slider 45' on the sub-frame 43'. This relationship is exactly the same as that of the slider 45' on each sub-frame 43' mounted below the upper frame 4, and a single push rod 20.

Accordingly, the slider 45' has exactly the same operation as the mechanism of FIGS. 5 and 6, so that engagement and disengagement of a roller 49 at the end of the push rod 20' with and from the fork-shaped hook 30 of the cover-operating link 23 of the single cover 15 of the pool hopper 10, and the opening and closing of the cover 15, are also exactly the same as those of FIGS. 5 and 6.

In the construction described above, when the start button of the apparatus (not shwon) is pushed and the motor 17 actuated, the sprocket wheel 32 is rotated by the gear mechanism, the cams 35, 35' are rotated by the follower sprocket wheels 34, and the arms 38, 38' are made to perform a rocking revolution through the set angle by the cam followers 39, 39'. Accordingly, the rotary links 40, 40' also perform a rocking rotation through the set angle, with a set period.

As a result, the base ends of a predetermined number of connecting rods 41, 41' arranged around the rotary links 40, 40' on the pins 42 perform a rocking rotation, so that the sliders 45, 45' move back and forth in the radial direction with respect to the corresponding sub-frames 43, 43'.

Meanwhile, the objects being measured are distributed into the troughs 9 around the dispersion table 7 by the table 7 that is vibrated and rotated in the circumferential direction through the set angle by the electromagnetic vibrator 8. Thus, the objects are distributed in quantites that vary to a certain extent.

The objects dispersed into each trough 9 are then transferred into the corresponding pool hoppers 10 by being vibrated by the electromagnetic vibrator 5.

When the solenoid 53 of the slider 45', that is moved back and forth in the radial direction on the guide bar 44' of the corresponding sub-frame 43 mounted below the upper frame 4 by a controller (not shown), operates, its tip 55 projects sideways against the force of the compressive spring 54 and the rack 56 meshes with the rack 52 on the push rod 20' that has so far been urged inward by the compression spring 50, and is stopped. Accordingly, the push rod 20' also moves integrally back and forth in the radial direction with respect to the sub-frame 43' against the force of the compression spring 50. During its outward movement, the push rod enters the fork-shaped hook 30 of the cover-operating link 23 of the pool hopper 10 and opens the cover 15 in its opening direction against the force of the tension spring 28, so that the objects being measured that had been held are charged into the measuring hopper 12 therebelow.

When the push rod 20' is performing its rearward stroke, the solenoid 53 is released by the timer operation of a controller and its tip 55 is moved inward by the compression spring 54 so that the racks 52 and 56 disengage from each other, the push rod 20' is moved back inward by the force of the compression spring 50 to its original position, and the cover 15 of the pool hopper 10 is forced to its closing position by the tension spring 28.

During this process, the roller 49 at the end of the push rod 20 enters the fork-like hook 30 of the cover-operating link 23, and during the return process, the spring constant of the tension spring 28 of the pool hopper 10 which guides the hook 30 may be small. Hence, the vibration caused during the opening and closing of the cover 15 of the pool hopper 10 is reduced.

The operation described above is similar to that of the cover 16 of the measuring hopper 12, which will now be described.

The weight of the objects being measured that are thus charged into the measuring hopper 12 is immediately detected by the load cell 11 fitted to the sub-frame 43, and the detected weight is input to the microcomputer, not shown. All the weights from all the measuring hoppers 12 are compared and calculated to determine which measuring hoppers 12 provide the most suitable combination for the set weight, using the plus minimum over quantity, and to decide into which gathering chute 13 or 14 the objects are to be discharged. Decision signals are then input to the solenoids 53 of the sliders 45 on each sub-frame 43, and a current is applied to each of the chosen solenoids 53 engaging with the rods 20 on the operating side of the covers 16 or 16' corresponding to the designated chute, by one each of the two tips 55 of the sliders 45 that have so far been moving back and forth in the radial direction in an idling manner. Hence, the corresponding tip 55 projects sideways against the force of the compression spring 54, and its rack 56 meshes with the rack 52 of the push rod 20 that has been moved back inward by the compression spring 50, in the same way as described above, thereby projecting integrally the push rod 20 outward against the force of the compression spring 50. Then, the roller 49 at its end enters the fork-shaped hook 30 of the cover-operating link 24 or 25 of the measuring hopper 12 and opens the cover 16 or 16' of the designated gathering chute to discharge the objects being measured into the designated gathering chute 13 or 14.

When the supply of current to the solenoid 53 is released by the set timer operation, the tip 55 is pulled inward by the force of the compression spring 54, the rack 52 disengages from the rack 56, and the push rod 20 is automatically slid back inward by the force of the compression spring 50, returning it to its initial state.

When the covers 16 or 16' of the measuring hoppers 12 that have been selected for the combination, and have thus been emptied by the discharge of the objects being measured, are returned to their original state by the tension springs 29, the covers is of only the pool hoppers 10 corresponding to those measuring hoppers 12 operate upon receipt of a signal from the controller (not shown), and the objects being measured are again charged into the measuring hoppers 12. The fresh objects being measured are also supplied to the pool hoppers 10. As the processes described above are repeated, the articles which are to be packaged in single packages containing the possible plus minimum over quantity are sequentially and alternately discharged into the gathering chutes 13, 14 and are then transferred to the packaging step.

Figure 7:
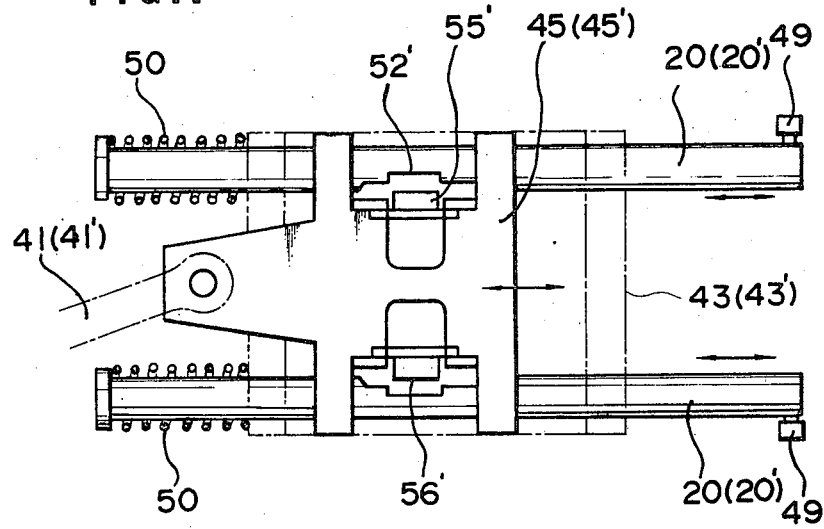
FIG. 7 is a schematic plan view of the between a slider and push rods of another embodiment.
Figure 8:
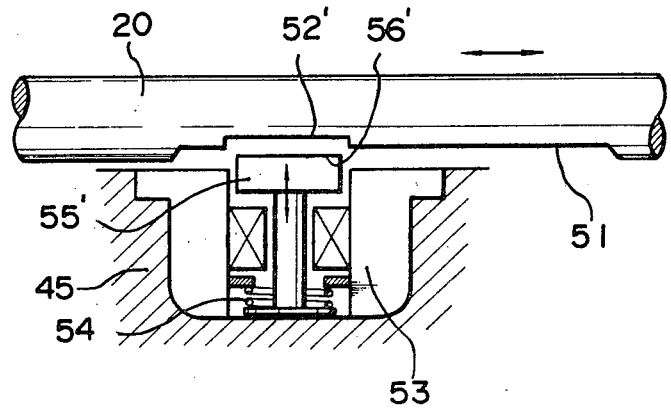
FIG. 8 is a schematic enlarged partial plan view of the clutch connection between a push rod and a slider of another embodiment.

In the embodiment shown in FIGS. 7 and 8, the outer end of the tip 55' is made to be a flat surface 56' instead of the racks 52, 56 shown in FIGS. 5 and 6, and this flat surface 56' engages with and disengages from the corresponding flat groove 52' in each push rod 20 (20'). The action and effect of this embodiment is substantially the same as that of the previous embodiment.

In the embodiments described above, after the measurement is completed, the predetermined selection is decided, the covers 16 are opened, and the measured objects are discharged into the gathering chutes 13, 14. In a mode in which the packaging apparatus is connected directly to the lower parts of the gathering chutes 13, 14 by shoulders, for example, clogging of the measured objects or the articles being packaged, that is, a phenomenon called "bridging" of the articles, will be induced by the instantaneous discharge of large quantities of articles. This phenomenon is not very severe when the quantities are small, but when the quantities are relatively large, the vortex motion of the descending articles will make them jump, even if bridging does not occur, and, in the worst case, vigorous interference will occur between the articles which will damage them.

To prevent this problem, a so-called "time-difference discharge" must be effected. This can be accomplished by providing time differences between the opening of the covers 16, 16' of the measuring hoppers 12 of the predetermined combination. In the embodiments described above, however, since the covers 16, 16' of the measuring hoppers 12 are opened and closed together at the same timing, the merit of time-difference discharge is hindered.

An embodiment as shown in FIGS. 9 through 12 can be employed in order to solve this problem.

Three oval, grooved cams 351, 352, 353 for three measuring hoppers and one oval cam 35' for a pool hopper are disposed in the circumferential direction at spacings of about 90°, linked to the motor 17 by four electromagnetic brakes 59 and gears 33', 34' which are connected to the motor 17 by electromagnetic clutches 60. The cams 351, 352, 353 and 35' are rotated at a predetermined timing by the electromagnetic clutches 60.

Figure 11:
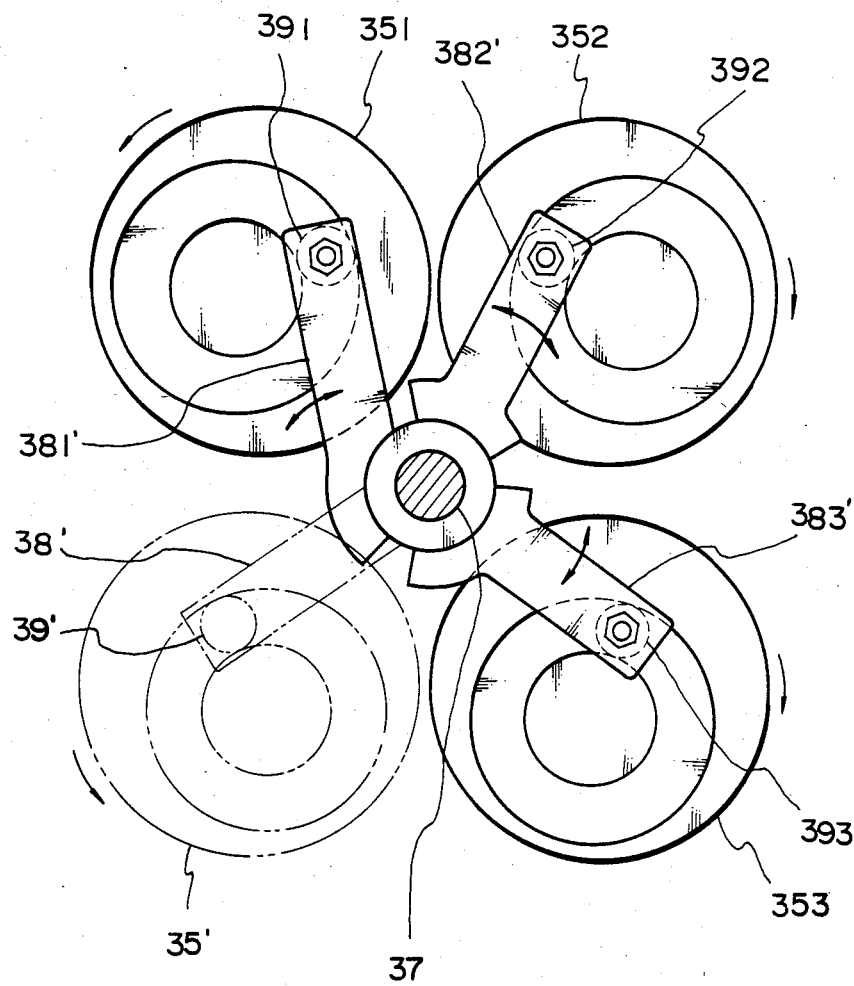
FIG. 11 is a plan view of the arrangement of oval cams with respect to the rotary cams.
Figure 12:
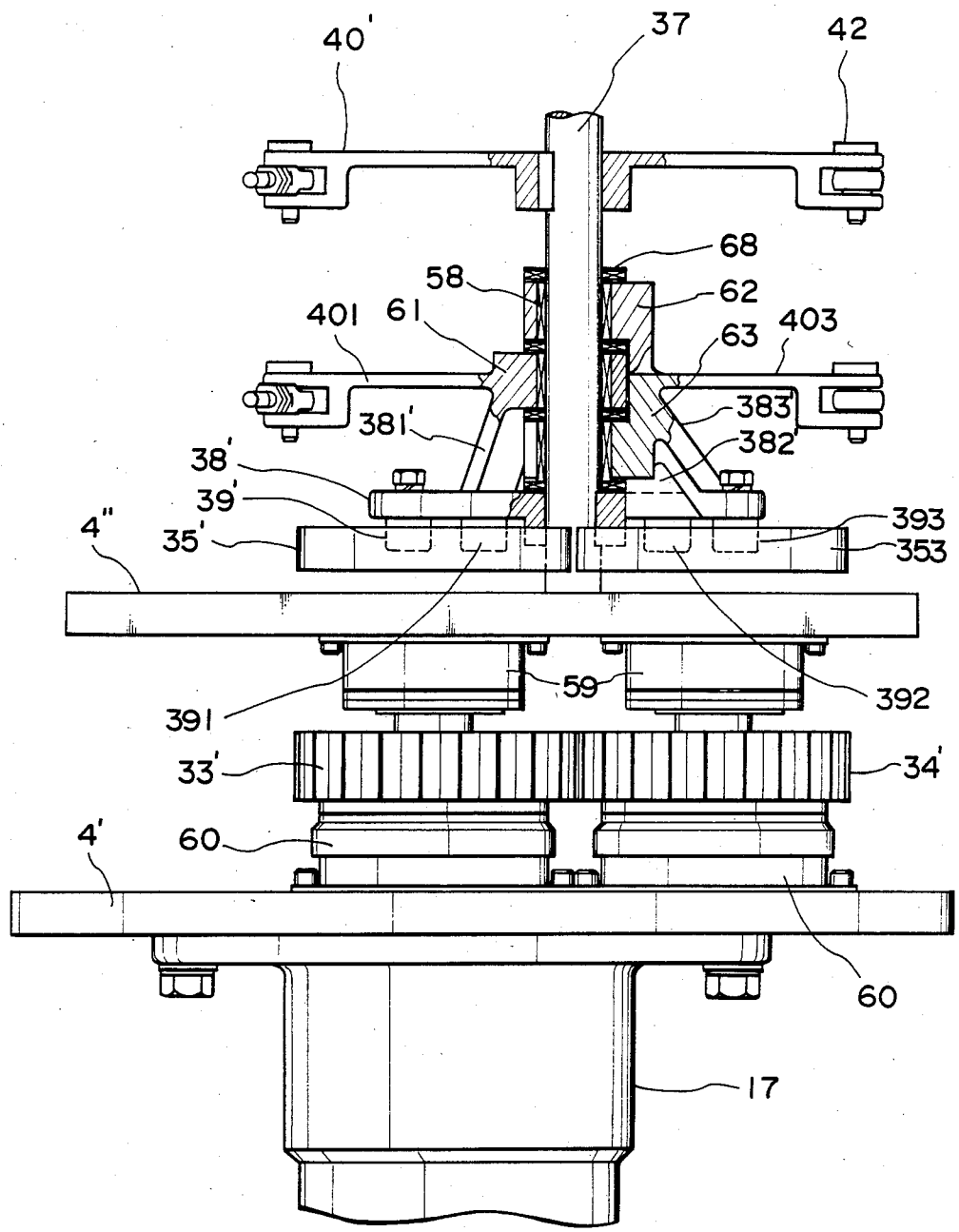
FIG. 12 is a sectioned side view of portions of the rotary cams, oval cams and pool hopper rotary cams.

A rotary link 40', which is the same as the rotary link of the embodiments described above is attached by a key to the upper part of the rocking shaft 37 which is pivotally inserted in the frame 4", and the base of the arm 38' pivotally supporting the cam follower 39 which meshes with the oval groove in the oval, grooved cam 35' is attached to the rocking shaft 37 below the rotary link 40', as shown in FIG. 11.

Figure 10:
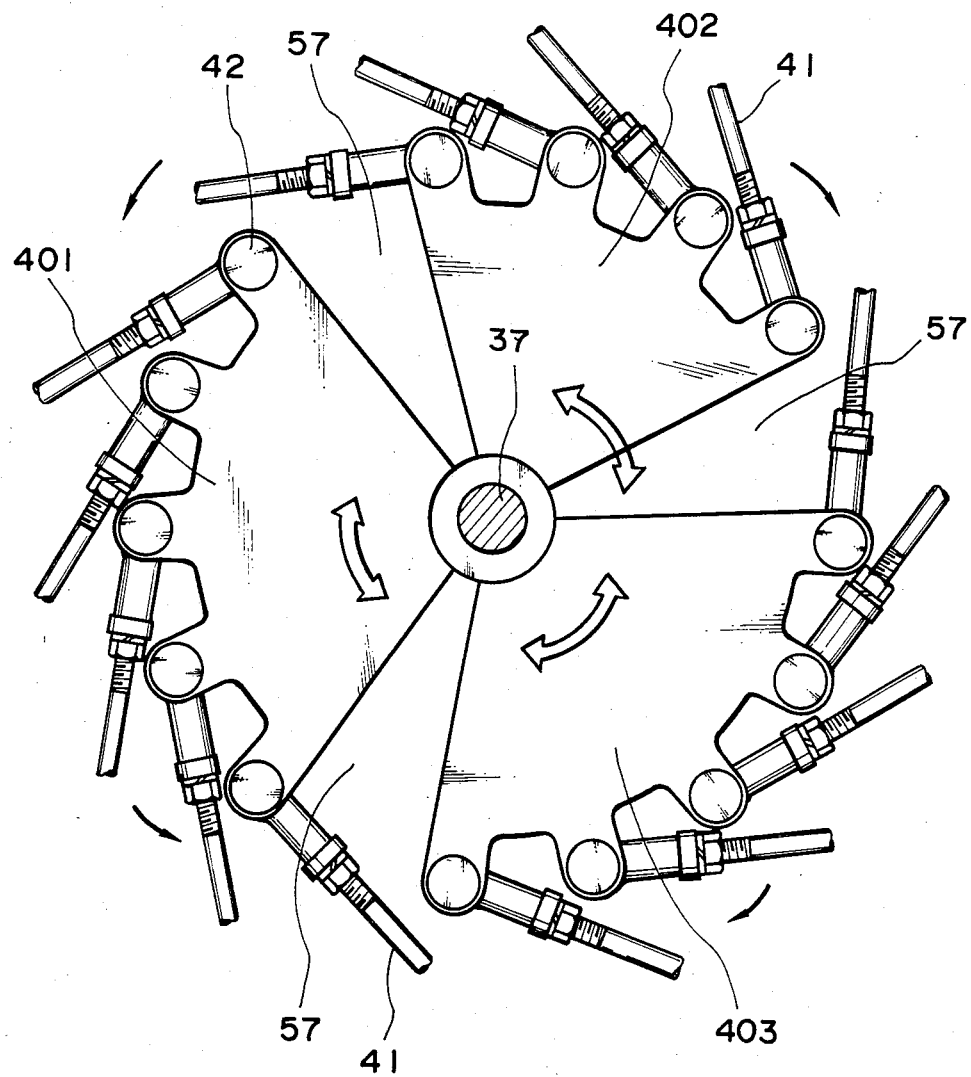
FIG. 10 is a plan view of the mutual arrangement of the rotary cams.

Three bearing bosses 61, 62, 63 are each attached intermediate part of the rocking shaft 37 by roller-type radial bearings 58 and thrust bearings 68 in a vertical arrangement, and three fan-shaped rotary links 401, 402, 403 of a similar shape which define fan-shaped spaces 57 of a small angle between them are arranged in the same horizontal plane, as shown in FIG. 10. Arms 381', 382', 383' extend diagonal downward and integrally from the boss bearings 61, 62, 63, respectively, as shown in FIG. 11, and cam followers 391, 392, 393 are pivotally supported at the ends of these arms, respectively. The cam followers mesh with the oval grooves cams 351, 352, 353, and rock around the rocking shaft 37. Accordingly, the fan-shaped rotary links 401, 402, 403 can rock independently around the rocking shaft 37 without any mutual interference.

The rotary links rock independently of one another when the oval, grooved cams 351, 352, 353 are rotated independently of one another by the electromagnetic clutches 60 with the rotation of the motor 17, so that each connecting rod 41 can operate the slider 45 for each block independently in each fan-shaped rotary link 401, 402, 403.

During the process in which each fan-shaped rotary link 401, 402, 403 rocks independently, the fan-shaped spaces 57 defined between the rotary links become zero so that the rotary links do not interfere with one another.

Figure 9:
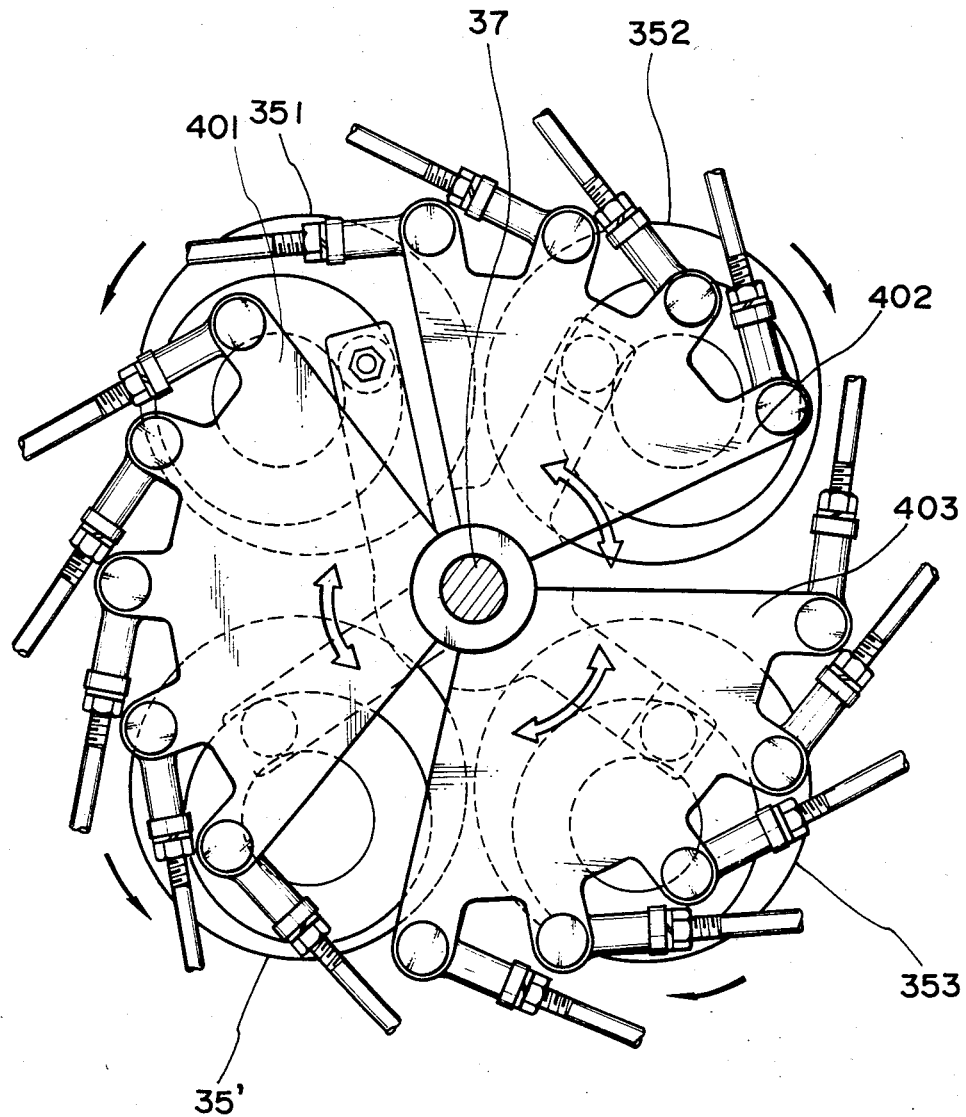
FIG. 9 is a plan view of the mechanism of rotary cams for the measuring hoppers.

FIG. 9 is a plan view showing FIGS. 10 and 11 superimposed.

As described above, the opening and closing of the cover 16 of each measuring hopper 12 is controlled by at least three different timing differences due to the mutually-independent rocking motions of the rotary links 401, 402, 403 of each block.

Accordingly, when a controller (not shown) generates control signals to open the covers 16 of the measuring hoppers 12 of the combination selected after the combination measurement has been completed, the electromagnetic clutches 60 of the fan-shaped rotary links 401, 402, 403 corresponding to the selected measuring hoppers 12 operate at time delays set by predetermined time delay control circuits, and rotate the oval, grooved cams 351, 352, 353. Accordingly, the arms 381', 382' 383' are operated with the same time delays by the cam followers, so that the fan-shaped rotary links 401, 402, 403 also rock with time delays, and each of the connecting rods 41 pivotally supported by each fan-shaped rotary link 401, 402, 403 also operates with the time delay of its rotary link, moving the sliders 45 back and forth. Since the solenoids 53 determined for the combination selection do not operate in the same way as in the embodiments described above, the racks 52 engage wtih the racks 56, and the covers 16, 16' of the selected measuring hoppers 12 are opened in the same way as in the embodiments described above. Accordingly, some of the predetermined number of measuring hoppers 12 given by the selection, for example, three out of five measuring hoppers 12, perform a time-difference discharge with set time delays between them. For this reason, a large quantities of articles can be smoothly discharged without any clumping or interference within the gathering hoppers 13, 14, particularly at the neck portions thereof.

When the rotary link 40 for the pool hoppers 10 is rocked by the rotation of the cam follower 39' relative to the oval groove of the oval, grooved cam 35' by the arm 38' at the lower part of the rocking shaft 37, all the connecting rods 41' arranged in the circumferential direction operate at the same time, so that the covers 15 of each pool hopper 10, 10' are simultaneously opened or closed, in the same way as in the embodiments described above.

The present invention is not, of course, limited to the embodiment described above and various other embodiments thereof can be employed. For instance, weight detectors can be disposed between the subframes.

In accordance with the present invention, the size of the combination measuring apparatus can be fundamentally reduced, particularly in the lateral direction, and its diameter and installation space requirements can be reduced. Since the apparatus can be made more compact than before, and the space within it can be efficiently utilized, the space requirements of the apparatus can be reduced and the apparatus will not hinder the operations of other apparatuses.

Since the apparatus itself is compact, the operating distances of its internal links, gears, and the like are smaller, and vibration of the apparatus can be suppressed. Accordingly, the apparatus has an improved durability, reduced wear and problems, and its maintenance and inspection can be done easily.

Furthermore, since the objects being measured flow within the apparatus mainly by gravitational force, the efficiency of the apparatus is largely proportional to the flow quantity and flow speed, but since the apparatus is compact, the distance that the objects being measured flows through is short, and the performance, and thus the accuracy, of the apparatus can be markedly improved.

In the present invention, the push rods for opening and closing the covers of a large number of pool hoppers and measuring hoppers positioned circumferentially around the center of the apparatus are radially connected to rotary links that operated in an interlocking arrangement by a driving device provede at the center of the space within the apparatus via connecting rods, so that an opening and closing mechanism for each pool hopper and measuring hopper can be controlled from the center, and the space within the apparatus can be utilized three-dimensionally. Accordingly, the internal space does not have local high density spots, but can be utilized uniformly. This eliminates the eccentric disposition of various high-density mechanisms and improves the freedom of design, enabling each mechanism to operate smoothly.

Although the connecting rods gather at the center, no design problem occurs because they are connected to rotary links. The end of each connecting rod is connected to a slider moving back and forth on a sub-frame corresponding to each pair of pool hopper and measuring hopper, and hence only a sub-frame provided with a slider and which has a simple structure is required to correspond to each pool hopper and measuring hopper. Hence, no design problem occrus, either, when designing each sub-frame and slider.

A clutch is formed on each push rod at a peripheral portion some distance from the center and close to the sub-frame where larger design dimensions can be obtained. This clutch can control the forward and backward movement of the push rod with respect to the operating link for the cover of each pool hopper or measuring hopper.

A weight detector such as a load cell for the measuring hopper, which is conventionally positioned at an outer position, can be fitted radially for each sub-frame. Thus, the weight detectors can be fitted by utilizing the spaces between the measuring hoppers without raising any design problems. Moreover, since a weight detector can be positioned on the inner side of each measuring hopper, the outer dimentions of the combination measuring apparatus can be further reduced in the radial direction.

As described already, since the apparatus can be made compact, vibrations are suppressed which markedly improves the weight-detecting performance of the weight detectors for the measuring hoppers.

Since the size of the apparatus can be reduced, its overall weight and the cost of its materials can also be reduced. Since its weight can be thus reduced, its transportation charge is also less.

Although the apparatus is made compact, the space within in can be utilized sufficiently and deficiently with a more uniform density, and this eliminates the necessity that each of the mechanical portions must be forced to be compact, so that they can be produced easily.

What is claimed is:

1. In a combination measuring apparatus of the type in which a large number of troughs are arranged radially around a dispersion table and pool hoppers and measuring hoppers are positioned vertically so as to correspond to each of said troughs, and a driving device for push rods mating with cover-operating links for covers of said pool and measuring hoppers is positioned within the circle of said pool and measuring hoppers, the improvement wherein comprising sliders connected to said driving device by connecting rods connected to rotary links said sliders providing clutches for the selective engagement of each of the sliders to each corresponding push rods, and wherein said push rods can move back and forth in the radial direction relative to subframes disposed on a frame and can engage with said clutches of said sliders disposed on said sub-frames.

2. The combination measuring apparatus as defined in claim 1 wherein one of said rotary links for said pool hoppers and one of said rotary links for said measuring hoppers are fitted concentrically with one another, and are each connected to separate cam mechanisms.

3. The combination measuring apparatus as defined in claim 2 wherein said clutches are racks connected to solenoids, and which are positioned on said frame so as to face said subframes of said push rods.

4. The combination measuring apparatus as defined in claim 2 wherein the end of each of said push rods is a roller while the driven end of each of said cover-operating link has a forked shape.

5. The combination measuring apparatus as defined in claim 1 wherein said clutches are racks connected to solenoids, and which are positioned on said frame so as to face said sub-frames of said push rods.

6. The combination measuring apparatus as defined in claim 5 wherein the end of each of said push rods is a roller while the driven end of each of said cover-operating link has a forked shape.

7. The combination measuring apparatus as defined in claim 1 wherein the end of each of said push rods is a roller while the driven end of each of said cover-operating link has a forked shape.

8. In a combination measuring apparatus of the type in which a large number of troughs are arranged radially around a dispersion table and pool hoppers and measuring hoppers are positioned vertically so as to correspond to said troughs, and a driving device for push rods mating with cover-operating links for covers for said pool and measuring hoppers is positioned within the circle of said pool and measuring hoppers, the improvement wherein sliders are connected to said driving device by connecting rods connected to rotary links, said sliders providing clutches for the selective engagement of each of the sliders to each corresponding push rod, and wherein said push rods can move back and forth in the radial direction relative to sub-frames disposed on a frame and can engage with said clutches of said sliders disposed on said sub-frames, and a support weight detector is provided on each of said sub-frames.

9. The combination measuring apparatus as defined in claim 8 wherein said weight detector is a load cell which is fitted to each of said sub-frames in the radial direction.

10. In a combination measuring apparatus of the type in which a large number of troughs are arranged radially around a dispersion table and pool hoppers and measuring hoppers are positioned vertically so as to correspond to each of said troughs, and a driving device within the circle of said pool and measuring hoppers, the improvement wherein sliders connected to said driving device by connecting rods connected to rotary links, said sliders providing clutches for the selective engagement of each of the sliders to each corresponding push rod, and said push rods can move back and forth in the radial direction relative to sub-frames disposed on a frame and can engage with said clutches of said sliders disposed on said sub-frames, said rotary links corresponding to said measuring hoppers consisting of a plurality of rotary links supported pivotally and concentrically and connected to mutually-independent rocking mechanisms.

11. The combination measuring apparatus as defined in claim 10 wherein said rotary links have a fan shape.

12. The combination measuring apparatus as defined in claim 10 wherein a shaft pivotally supporting each of said rotary links is a rocking shaft of said rotary link for said pool hoppers.

13. The combination measuring apparatus as defined in claim 10 wherein said mutually-independent rocking mechanisms are oval cam mechanisms.

14. The combination measuring apparatus as defined in claim 13 wherein said oval cam mechanism is connected to a motor by an electromagnetic clutch.

* * * * *